Patented Feb. 13, 1940

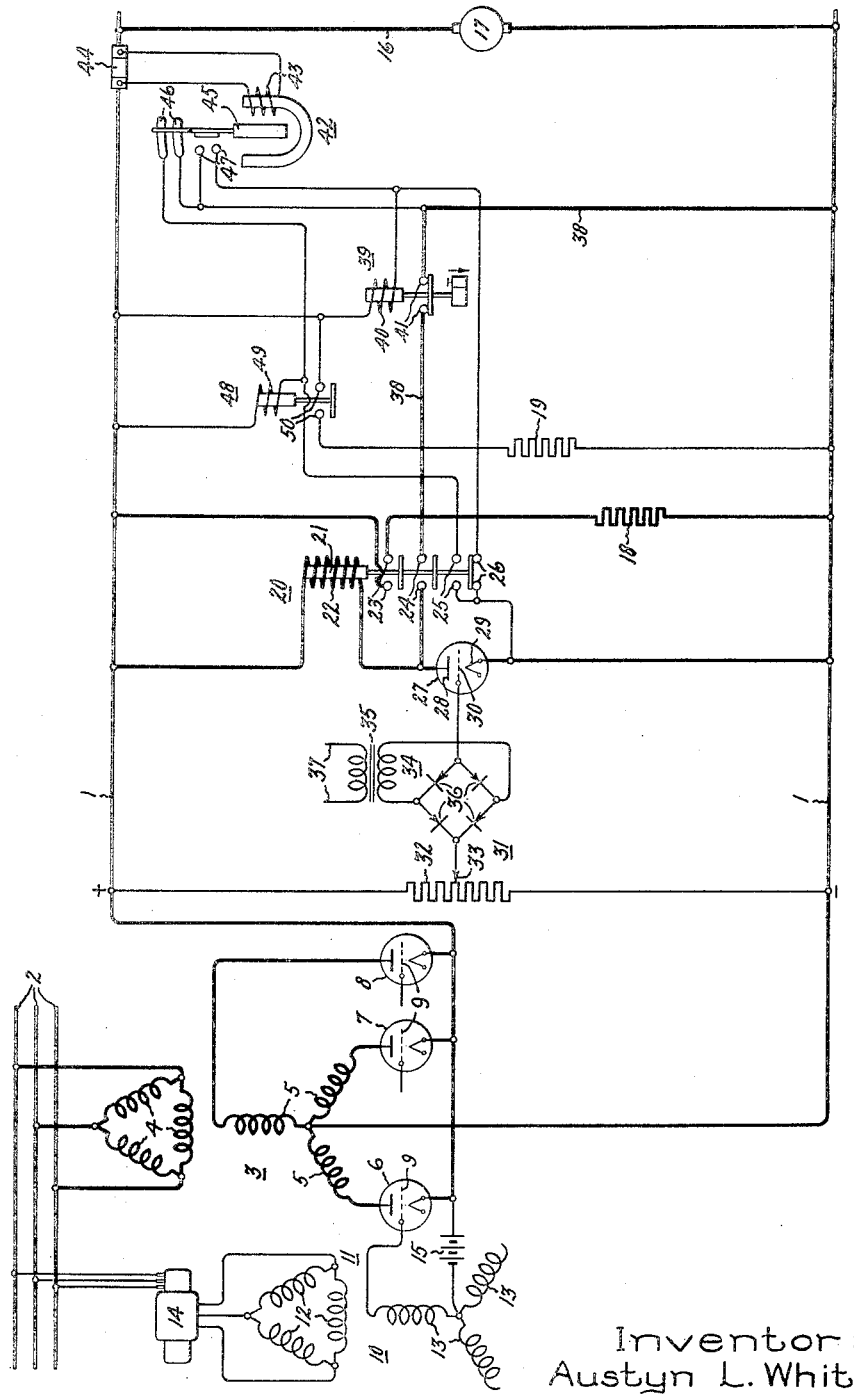

2,190,527

UNITED STATES PATENT OFFICE 2,190,527

ELECTRIC VALVE CIRCUIT

Austyn L. Whiteley, Rugby, England, assignor to General Electric Company, a corporation of New York Application April 12, 1939, Serial No. 267,462
In Great Britain June 10, 1938

8 Claims. (Cl. 171—97)

My invention relates to electric valve circuits and more particularly to a control system for electric valve translating apparatus for energizing a regenerative direct current load circuit from an alternating current supply circuit.

Electric valve apparatus is frequently employed to energize a regenerative direct current load circuit from an alternating current supply circuit through electric valve translating apparatus. For example, electric valve means are employed to energize direct current load circuits used in traction systems. Heretofore there have been devised arrangements for controlling such systems under regenerative conditions to connect across the direct current load circuit a suitable load device, or suitable load devices, to absorb the energy due to regeneration and to maintain the voltage across the direct current circuit within the desired range of operating values. Such a control system is disclosed and claimed in my copending joint patent application Serial No. 225,468, filed August 17, 1938, and assigned to the assignee of the present application. In accordance with the teachings of my invention described hereinafter, I provide a new and improved control circuit for effecting rapid and precise operation of a control system which limits the voltage of the direct current circuit under regenerative conditions of the load circuit.

It is an object of my invention to provide a new and improved electric valve circuit.

It is another object of my invention to provide a new and improved control system for a regenerative direct current load circuit energized from an alternating current supply circuit through electric valve translating apparatus.

It is a further object of my invention to provide a new and improved control system for limiting the voltage and absorbing power from a regenerative load circuit.

In accordance with the illustrated embodiment of my invention, I provide a new and improved control system for limiting the voltage and absorbing power from a regenerative direct current load circuit, such as a traction circuit, which is energized from an alternating current supply circuit through electric valve means. A load device, such as a resistance of suitable value for absorbing relatively large amounts of current, is employed and is connected across the terminals of the direct current load circuit by means of a contactor mechanism including an actuating winding. The contactor mechanism comprises contacts for connecting the resistance across the load circuit and also includes auxiliary contacts. An electric valve means is employed to initiate energization of the actuating coil in response to voltage conditions of the direct current load circuit and comprises an anode-cathode circuit connected directly in series relation with the actuating coil of the contactor mechanism. Suitable voltage responsive means, such as a voltage divider, energizes a control member of the electric valve means to render the electric valve means conductive when the voltage of the direct current load circuit attains a predetermined value. An auxiliary or control electric circuit operated by auxiliary contacts of the contactor mechanism effectively shunts the electric valve means when the contactor mechanism is operated to the closed circuit position, so that the actual period of conduction of the electric valve means is relatively short, thereby limiting the load imposed on the electric valve means and permitting the use of an electric valve means of relatively small rating compared with the amount of current which is required to effect actuation of the contactor mechanism. The control circuit comprises a timing means which opens the control circuit a predetermined interval of time after the contactor mechanism is moved to the closed circuit position, so that the resistance is connected across the direct current load circuit for only a predetermined interval of time. A power directional or current directional means is employed to control the timing means to maintain the auxiliary or control circuit in the closed circuit position, depending upon the duration of the regenerative period or the period of reverse power flow.

For a better understanding of my invention, reference may be had to the following description taken in connection with the accompanying drawing, and its scope will be pointed out in the appended claims. In the single figure of the accompanying drawing, my invention is diagrammatically illustrated as applied to a regenerative traction circuit energized from an alternating current supply circuit through electric valve means.

Referring now to the single figure of the accompanying drawing, my invention is there diagrammatically illustrated as applied to a system for energizing an electric circuit such as a direct current circuit 1 from an alternating current supply circuit 2 through electric translating apparatus comprising a transformer 3 having primary windings 4 and secondary windings 5 and electric valve means 6, 7 and 8. The electric valve means 6, 7 and 8 are preferably of the type employing an ionizable medium, such as a gas or a vapor, and each comprises a control member 9 which controls the conductivity thereof. As a means for controlling the magnitude of the voltage impressed on the direct current circuit 1 by the electric valve means, I employ an excitation circuit 10 comprising a transformer 11 having primary windings 12 and secondary windings 13. The transformer 11 may be energized from the alternating current circuit 2 through a suitable phase shifting device, such as a rotary phase shifter 14. A suitable source of negative unidirectional biasing potential, such as a battery 15, may be connected in the excitation circuit 10.

The direct current circuit 1 is connected to energize a regenerative load circuit such as a direct current load circuit 16, which may be a traction circuit, and which may comprise a motor 17 capable of regenerating under certain operating conditions.

As a means for limiting or controlling a predetermined electrical condition such as the voltage of the direct current circuit 1 during regenerative periods of the load circuit 16 and to absorb a sufficient amount of power to so limit the voltage, I employ a plurality of load devices such as resistances 18 and 19. The resistance 18 is chosen to absorb a relatively large amount of current, such as current of the order of magnitude of 400 or 500 amperes, whereas the resistance 19 is chosen to transmit a smaller amount of current. I provide a contactor mechanism 20 comprising a plunger or armature 21, an actuating coil 22, a pair of contacts 23 connected in series relation with the resistance 18 for connecting the resistance across the direct current circuit 1, and auxiliary or control contacts 24, 25 and 26. Contacts 26 are normally in the closed circuit position, that is, are closed when the contactor mechanism is deenergized. In order to effect energization of the actuating coil 22 of the contactor mechanism 20 when the voltage of the direct current circuit 1 attains a predetermined value, I provide an electric valve means 27, which is preferably of the type employing an ionizable medium such as a gas or a vapor, and which comprises an anode 28, a cathode 29 and a control member 30. The anode-cathode circuit of the electric valve means 27 is connected in series relation with the actuating coil 22 and serves to energize that coil from the direct current circuit 1 under certain voltage conditions. To render the electric valve means 27 conductive and for effecting operation of the contactor mechanism 20 when an electrical condition such as the voltage of the direct current circuit 1 attains a predetermined value, I provide a voltage responsive circuit 31 which may comprise a voltage divider including a resistance 32 provided with an adjustable tap 33 and a suitable source of negative biasing potential such as a full wave rectifier circuit 34 comprising a transformer 35 and a plurality of unidirectional conducting devices 36. The transformer 35 may be energized from any suitable source of alternating current 37. Of course, the transformer 35 may be connected to the alternating current circuit 2 if desired. The output voltage of the rectifier circuit 35 is connected in opposition to the component of voltage derived from resistance 32. The voltage at which the electric valve means 27 is rendered conductive and hence the voltage at which the contactor mechanism 20 is actuated may be determined or established by the adjustment of contact 33 of resistance 32.

In order to relieve the duty imposed on the electric valve means 27 after it has performed the initiating function of energizing the contactor mechanism 20, I provide an auxiliary or control circuit 38 which shunts the anode-cathode circuit of the electric valve means 27. The control circuit 38 is connected to contacts 24 of the contactor mechanism 20. I employ a suitable timing means, such as a time delay relay 39, which opens the control circuit 38 and deenergizes the actuating coil 22 of the contactor mechanism 20 a predetermined interval of time after the closure of the contactor mechanism in order to prevent the connection of the resistance 18 across the direct current circuit 1 for an unwarranted period of time. In other words, the timing means 39 assures the connection of the resistance 18 to the direct current circuit 1 for only a minimum period of time. The time delay relay 39 comprises an actuating coil 40 and contacts 41 which are connected in control circuit 38. It will be noted that the actuating coil 40 is normally energized when the contactor mechanism 20 is in the deenergized position through the normally closed contacts 26. As a means for assuring that the time delay relay 39 is maintained in the closed circuit position so long as a regenerative condition exists and to prevent deenergization of the contactor mechanism 20 under such conditions, I employ a suitable power directional or current directional means, such as a polarized relay 42, comprising a coil 43 which may be energized from the direct current circuit 1 through a shunt 44. The polarized relay 42 comprises an armature 45 and two sets of contacts 46 and 47. Contacts 47 are connected in circuit with actuating coil 40 of the time delay relay 39 and serve to connect this coil across the direct current circuit so long as a reverse power or reverse current condition exists.

I also employ an additional relay 48 which connects the resistance 19 across circuit 1 when the contactor mechanism 20 is in the closed circuit position. The relay 48 comprises an actuating coil 49 and contacts 50. The actuating coil 49 is connected in circuit with contacts 25 of the contactor mechanism 20 and the contacts 50 are connected in circuit with resistance 19 to connect that resistance across the direct current circuit 1. To assure that the relay 48 is energized during the regenerative period and for relatively small values of power in the normal direction of power flow, contacts 46 of the relay 42 are designed to connect actuating coil 49 in circuit during the time of reverse power flow and for small values of power flow in the normal direction.

The operation of the embodiment of my invention shown in the single figure of the accompanying drawing will be explained by considering the system when it is operating to transmit power to the direct current load circuit 16. The voltage of the direct current circuit 1 is controlled by adjustment of the rotary phase shifter 14 and unidirectional current is transmitted to the circuit 1 by electric valve means 6, 7 and 8 which transmit current in a predetermined order depending upon the phase rotation of the secondary windings 5 of transformer 3.

If the load circuit 16 regenerates, causing a rise in voltage of circuit 1, contactor mechanism 20 is energized initially by the electric valve means 27, effecting connection of the resistance 18 across the direct current circuit 1 and absorbing sufficient power to maintain the voltage of circuit 1 within the desired range of values. As the voltage of circuit 1 increases, it will be understood that the component of voltage derived from resistance 32 also increases and ultimately exceeds the negative unidirectional biasing potential provided by rectifier 34, to render electric valve 27 conductive. An initial impulse of current is transmitted by valve 27 and effects energization of actuating coil 22, thereby closing contacts 23, 24 and 25 and opening the normally closed contacts 26. When contacts 23 are closed, the resistance 18 is connected across the direct current circuit 1. Closure of contacts 24 completes control circuit 38, which effectively shunts the anode-cathode circuit of electric valve means 27 so that current is no longer conducted by the electric valve means, relieving the duty imposed thereon. Opening of contacts 26 in the absence of a sustained reverse power condition initiates a timing operation by deenergizing actuating coil 40 of time delay relay 39. The time delay relay 39 opens after the lapse of a predetermined interval of time and effects deenergization of actuating coil 22 of the contactor mechanism 20 and consequently disconnects resistance 18 from circuit 1. In this manner, it is assured that the resistance 18 is not connected to the load circuit 1 for an unwarranted period of time so that the system does not incur excessive losses. However, if the reverse current or power condition obtains for an extended period, the operation of the time delay relay 39 is prevented by the relay 42 which maintains contacts 47 in the closed circuit position and also maintains actuating coil 40 of relay 39 in an energized condition. Since the coil 40 is energized, the auxiliary or control circuit 38 is maintained in the closed circuit position and actuating coil 22 is also energized. When the reverse current condition no longer exists, armature 45 of relay 42 disengages contacts 47 so that relay 39 is deenergized and subsequently the contactor mechanism 20 is deenergized, thereby disconnecting resistance 18.

Relay 48 assures connection of the load resistance 19 across the direct current circuit 1 to absorb a predetermined minimum amount of current from the electric valve translating apparatus through the transition from a regenerative condition to a power transmitting condition of the system. It will be apparent to those skilled in the art that some power absorbing means must be connected across the direct current circuit 1 during the regeneration of the load circuit 16. When the contactor mechanism 20 operates in response to the voltage of circuit 1, actuating coil 49 of relay 48 is energized through contacts 25 and the energization of the actuating coil 49 is assured during the transition period by means of contacts 46 of relay 42. The contacts 46 of relay 42 are adjusted so that the relay 48 is energized to connect resistance 19 across circuit 1 during the reverse power flow conditions, during the transition period and for power transfer in the normal direction less than a predetermined minimum amount, such as one or two per cent of the normal power transfer.

An important feature of my invention is the arrangement which permits the use of a highly sensitive electric valve means for initiating the operation of the actuating coil 22 of the contactor mechanism 20, but which immediately upon the actuation relieves the current transmitting duty by connecting across the electric valve a shunt circuit. A further important feature is the desirability of connecting the anode-cathode circuit of the control electric valve means directly in circuit with the actuating coil of the contactor mechanism, thereby avoiding the use of auxiliary control apparatus and at the same time obtaining the advantage of quick response to the over-voltage condition.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an electric circuit, means for energizing said electric circuit, a regenerative load circuit, a load device, and means for connecting said load device across said electric circuit when said load circuit regenerates comprising a contactor mechanism having an actuating coil, an electric valve means having an anode-cathode circuit connected in series relation with said actuating coil and means responsive to a predetermined electrical condition of said electric circuit for rendering said electric valve means conductive.

2. In combination, an electric circuit, means for energizing said electric circuit, a regenerative load circuit connected to said circuit, a load device, a contactor for connecting said load device across said electric circuit and comprising an actuating coil, an electric valve means having an anode-cathode circuit connected in series relation with said actuating coil and having a control member, and means responsive to the voltage of said electric circuit for energizing said control member to operate said contactor.

3. In combination, an electric circuit, means for energizing said electric circuit, a regenerative load circuit connected to said electric circuit, a load device, a contactor for connecting said load device across said direct current circuit and comprising an actuating coil, an electric valve means having an anode-cathode circuit connected in series relation with said actuating coil and having a control member, a circuit in parallel relation with respect to said electric valve means and being responsive to the operation of said contactor for shunting said electric valve means, and means responsive to the voltage of said electric circuit for rendering said electric valve means conductive.

4. In combination, a direct current circuit, a regenerative load circuit, a load device, an electric valve means having an anode, a cathode and a control member, a control circuit connected in parallel with the anode-cathode circuit of said electric valve means, a contactor mechanism having an actuating coil connected in series relation with the anode-cathode circuit of said electric valve means and comprising means for closing said control circuit and for connecting said load device across said direct current circuit, and means responsive to a predetermined electrical condition of said direct current circuit for rendering said electric valve means conductive.

5. In combination, a direct current circuit, means for energizing said direct current circuit, a regenerative load circuit, a load device, an electric valve means having an anode, a cathode and a control member, a control circuit connected in parallel with said electric valve means, a contactor mechanism having an actuating coil connected in series relation with the anode-cathode circuit of said electric valve means and comprising means for connecting said load device across said direct current circuit and for closing said control circuit, means responsive to a predetermined electrical condition of said load circuit for rendering said electric valve means conductive to actuate said contactor mechanism, and timing means connected in said control circuit to control the operative period of said contactor mechanism.

6. In combination, a direct current circuit, means for energizing said direct current circuit, a regenerative load circuit, a load device, an electric valve means having an anode, a cathode and a control member, a control circuit connected in parallel with said electric valve means, a contactor mechanism having an actuating coil connected in series relation with the anode-cathode circuit of said electric valve means and comprising means for connecting said load device across said direct current circuit and for closing said control circuit, means responsive to a predetermined electrical condition of said load circuit for rendering said electric valve means conductive to actuate said contactor mechanism, timing means connected in said control circuit to control the operative period of said contactor mechanism, and means responsive to the direction of power flow in said direct current circuit for controlling said timing means.

7. In combination, a direct current circuit, means for energizing said direct current circuit, a regenerative load circuit connected to said direct current circuit, a load device, a contactor for connecting said load device across said direct current circuit and comprising an actuating coil, an electric valve means having an anode-cathode circuit connected in series relation with said actuating coil and having a control member, means responsive to a predetermined electrical condition of said direct current circuit for rendering said electric valve means conductive, a circuit in parallel relation with said electric valve means and being responsive to the operation of said contactor for shunting said electric valve means, timing means connected in said control circuit to determine the operative period of said contactor, a second load device, means responsive to said contactor for connecting said second load device across said direct current circuit, and current directional means connected in said direct current circuit for controlling said last mentioned means and said timing means.

8. In combination, a direct current circuit, means for energizing said direct current circuit, a regenerative load circuit connected to said direct current circuit, a load device, a control circuit connected in parallel with said electric valve means, an electric valve means having an anode, a cathode and a control member, a contactor having an actuating coil connected in series relation with the anode-cathode circuit of said electric valve means for connecting said load device across said direct current circuit and for closing said control circuit so that said electric valve means conducts current only during the initiating operation of said contactor, means responsive to a predetermined electrical condition of said direct current circuit for rendering said electric valve means conductive, timing means connected in said control circuit to limit the period of time during which said load device is connected across said direct current circuit, a second load device, means responsive to said contactor for connecting said second load device across said direct current circuit, and current directional means connected in said direct current circuit for controlling the operative period of said last mentioned means and said timing means.

AUSTYN L. WHITELEY.